United States Patent
Segura

(10) Patent No.: US 7,343,976 B2
(45) Date of Patent: Mar. 18, 2008

(54) METHODS OF TREATING SUBTERRANEAN FORMATIONS USING DERIVATIZED GELLING AGENTS

(75) Inventor: Michael J. R. Segura, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 346 days.

(21) Appl. No.: 11/063,003

(22) Filed: Feb. 22, 2005

(65) Prior Publication Data
US 2006/0185850 A1 Aug. 24, 2006

(51) Int. Cl.
*E21B 43/22* (2006.01)
*E21B 43/26* (2006.01)

(52) U.S. Cl. ............... 166/300; 166/305.1; 166/308.2; 166/308.5; 507/211; 507/248; 507/251; 507/268; 507/903; 507/922

(58) Field of Classification Search ............. 166/308.2, 166/300, 305.1, 308.5; 507/248, 251, 268, 507/211, 903, 922
See application file for complete search history.

(56) References Cited

U.S. PATENT DOCUMENTS

| | | | | |
|---|---|---|---|---|
| 3,475,334 A * | 10/1969 | Boudreaux | | 507/214 |
| 4,067,389 A * | 1/1978 | Savins | | 166/246 |
| 4,293,036 A * | 10/1981 | Swanson | | 166/302 |
| 4,468,334 A | 8/1984 | Cox et al. | | 507/110 |
| 4,485,020 A * | 11/1984 | Shay et al. | | 507/213 |
| 4,486,340 A * | 12/1984 | Glass, Jr. | | 507/216 |
| 4,532,052 A | 7/1985 | Weaver et al. | | 507/222 |
| 4,579,670 A | 4/1986 | Payne | | 507/211 |
| 4,945,989 A * | 8/1990 | Irani et al. | | 166/268 |
| 4,946,604 A | 8/1990 | Smith | | 507/209 |
| 4,973,410 A | 11/1990 | Pinschmidt, Jr. et al. | | 507/221 |
| 5,305,832 A | 4/1994 | Gupta et al. | | 166/300 |
| 5,697,444 A * | 12/1997 | Moorhouse et al. | | 166/308.5 |
| 5,720,347 A * | 2/1998 | Audibert et al. | | 166/294 |
| 6,214,773 B1 | 4/2001 | Harris et al. | | 507/271 |
| 6,488,091 B1 | 12/2002 | Weaver et al. | | 166/300 |
| 6,682,916 B2 * | 1/2004 | Taoka et al. | | 435/158 |
| 6,971,448 B2 * | 12/2005 | Slabaugh et al. | | 166/294 |
| 7,001,872 B2 * | 2/2006 | Pyecroft et al. | | 507/211 |
| 2006/0030493 A1 | 2/2006 | Segura | | 507/244 |
| 2006/0196662 A1 * | 9/2006 | Hanes et al. | | 166/280.2 |

FOREIGN PATENT DOCUMENTS

| | | |
|---|---|---|
| EP | 0528461 A3 | 7/1992 |
| EP | 0528550 A3 | 7/1992 |
| GB | 2108122 A | 10/1982 |

OTHER PUBLICATIONS

Cimato, Alejandra N. et al, Antioxidant Effects of Water- and Lipid-soluble Nitroxide Radicals in Liposomes, 1987, Elsevier Science, New York, N Y, Abstract.*
Office Action from Application No. 10/909,988.
Search Report Application No. GB0515815.9.

* cited by examiner

*Primary Examiner*—George Suchfield
(74) *Attorney, Agent, or Firm*—Robert A. Kent; Baker Botts

(57) ABSTRACT

One embodiment of the present invention provides methods of treating a subterranean formation with a viscosified treatment fluid comprising combining water, a carbonyl-containing first compound, and an amine-containing second compound; wherein the carbonyl-containing first compound comprises at least one carbonyl moiety and is either a gelling agent or a derivatizing agent, and wherein the amine-containing second compound comprises at least one amine moiety and is a gelling agent when the carbonyl-containing first compound is a derivatizing agent and is a derivatizing agent when the carbonyl-containing first compound is a gelling agent; allowing at least one carbonyl moiety from the first compound and at least one amine moiety from the second compound to form a derivatizing linkage and create a derivatized gelling agent; and, placing the viscosified treatment fluid into a portion of a subterranean formation.

20 Claims, No Drawings

METHODS OF TREATING SUBTERRANEAN FORMATIONS USING DERIVATIZED GELLING AGENTS

BACKGROUND

The present invention relates methods of treating subterranean formations. More particularly, the present invention relates to methods for using derivatized gelling agents in subterranean treatment fluids.

Treatment fluids are used in a variety of operations and treatments performed in oil and gas wells. Such operations and treatments include, but are not limited to, production stimulation operations, such as fracturing, and well completion operations, such as gravel packing and frac packing.

An example of a production stimulation operation using a treatment fluid is hydraulic fracturing. That is, a type of treatment fluid, referred to in the art as a fracturing fluid, is pumped through a well bore into a subterranean zone to be stimulated at a rate and pressure such that fractures are formed or enhanced in a desired subterranean zone. The fracturing fluid is generally a gel, emulsion, or foam that may comprise a particulate material often referred to as proppant. When used, proppant is deposited in the fracture and functions, inter alia, to hold the fracture open while maintaining conductive channels through which such produced fluids can flow upon completion of the fracturing treatment and release of the attendant hydraulic pressure.

An example of a well completion operation using a treatment fluid is gravel packing. Gravel packing treatments are used, inter alia, to reduce the migration of unconsolidated formation particulates into the well bore. In gravel packing operations, particulates, referred to in the art as gravel, are carried to a well bore in a subterranean producing zone by a servicing fluid known as a carrier fluid. That is, the particulates are suspended in a carrier fluid, which may be viscosified, and the carrier fluid is pumped into a well bore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the well bore. While screenless gravel packing operations are becoming more common, traditional gravel pack operations involve placing a gravel pack screen in the well bore and packing the surrounding annulus between the screen and the well bore with gravel designed to prevent the passage of formation particulates through the pack with produced fluids, wherein the well bore may be oriented from vertical to horizontal and may extend from hundreds to thousands of feet. When installing the gravel pack, the gravel is carried to the formation in the form of a slurry by mixing the gravel with a viscosified treatment fluid. Such gravel packs may be used to stabilize a formation while causing minimal impairment to well productivity. The gravel, inter alia, acts to prevent the particulates from occluding the screen or migrating with the produced fluids, and the screen, inter alia, acts to prevent the gravel from entering the well bore.

In some situations the processes of hydraulic fracturing and gravel packing are combined into a single treatment to provide a stimulated production and an annular gravel pack to prevent formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

A variety of methods are used to create the treatment fluids typically used in subterranean operations. Often, a polysaccharide or synthetic polymer gelling agent is used to impart viscosity to an aqueous treatment fluid to, among other things, enhance proppant transport and reduce fluid loss from the treatment fluid into the formation. Frequently, a crosslinking agent, such as a metallic compound, is added to further enhance the viscosity of the fluid by coupling, or "crosslinking," the polymer gelling agent.

One common gelling agent used in treatment fluids is guar, a galactomannan type of polysaccharide which may be crosslinked to yield a high gel strength for suspension, and yet they can be relatively easily broken when desired (that is, the viscosity of the treatment fluid viscosified with guar may be reduced when desired). Because of its abundance, price, and geometry favorable to crosslinking, guar is the most commonly used gelling agent in treatment fluids.

Derivatized gelling agents may also be used. Derivatized polysaccharides presently used in subterranean formations are generally formed by placing the polysaccharide (generally a guar) in a high pH environment (generally at a pH of about 11 or greater) and exposing the polysaccharide to a reactive group having the desired derivatizing moiety. Some suitable reactive groups are halides and epoxides. Chloroacetic acid, sodium chloroacetate, ethylene oxide, and propylene oxide are the most commonly used derivatizing agents. It would be highly desirable in the industry to have a method of creating a derivatized polysaccharide suitable for use in a subterranean application that could be made without resorting to such harsh reaction conditions and without the need for extra process steps.

SUMMARY

The present invention relates methods of treating subterranean formations. More particularly, the present invention relates to methods for using derivatized gelling agents in subterranean treatment fluids.

One embodiment of the present invention provides methods of treating a subterranean formation with a viscosified treatment fluid comprising combining water, a carbonyl-containing first compound, and an amine-containing second compound; wherein the carbonyl-containing first compound comprises at least one carbonyl moiety and is either a gelling agent or a derivatizing agent, and wherein the amine-containing second compound comprises at least one amine moiety and is a gelling agent when the carbonyl-containing first compound is a derivatizing agent and is a derivatizing agent when the carbonyl-containing first compound is a gelling agent; allowing at least one carbonyl moiety from the first compound and at least one amine moiety from the second compound to form a derivatizing linkage and create a derivatized gelling agent; and, placing the viscosified treatment fluid into a portion of a subterranean formation.

Another embodiment of the present invention provides methods of fracturing a portion of a subterranean formation with a viscosified treatment fluid comprising combining water, a carbonyl-containing first compound, and an amine-containing second compound; wherein the carbonyl-containing first compound comprises at least one carbonyl moiety and is either a gelling agent or a derivatizing agent, and wherein the amine-containing second compound comprises at least one amine moiety and is a gelling agent when the carbonyl-containing first compound is a derivatizing agent and is a derivatizing agent when the carbonyl-containing first compound is a gelling agent; allowing at least one carbonyl moiety from the first compound and at least one amine moiety from the second compound to form a derivatizing linkage and create a derivatized gelling agent; and, placing the viscosified treatment fluid into a portion of a subterranean formation at a pressure sufficient to create or extend at least one fracture therein.

The features and advantages of the present invention will be readily apparent to those skilled in the art upon a reading of the description of the embodiments that follows.

DETAILED DESCRIPTION

The present invention relates methods of treating subterranean formations. More particularly, the present invention relates to methods for using derivatized gelling agents in subterranean treatment fluids.

The derivatized gelling agents of the present invention may be used to viscosify an aqueous based treatment fluid. They generally comprise a carbonyl-containing first compound comprising at least one carbonyl moiety, and an amine-containing second compound comprising at least one amine moiety. In some embodiments of the present invention the first compound is a gelling agent and the second compound is a derivatizing agent. In other embodiments, the first compound is a derivatizing agent and the second compound is a gelling agent. When combined, the carbonyl-containing first compound and amine-containing second compound combine to form a derivatized gelling agent. In some embodiments, the gelling agent is a polysaccharide. In some embodiments, the derivatized gelling agents of the present invention may be un-derivatized by changing the pH to which the derivatized gelling agent is exposed; in a manner similar to the way that boron crosslinked gels may be de-linked. The derivatizing linkages formed in the derivatized gelling agents of the present invention are generally stable from slightly acidic (pH of about 4) up to somewhat basic (pH of about 11).

Gelling agents (which may be either a carbonyl-containing first compound or an amine-containing second compound) suitable for use in the present invention typically comprise a natural polymer, a biopolymer, a synthetic polymer, or a combination thereof. A variety of gelling agents may be used in conjunction with the methods and compositions of the present invention, including, but not limited to, hydratable polymers that contain one or more functional groups such as hydroxyl, trans-hydroxyl, cis-hydroxyl, carboxylic acids, derivatives of carboxylic acids, sulfate, sulfonate, phosphate, phosphonate, amino, or amide. In certain exemplary embodiments, the gelling agents may be polysaccharides, and derivatives thereof that contain one or more of the following monosaccharide units: galactose, mannose, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose, and bacterial polysaccharides such as xanthan. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the treatment fluids of the present invention in an amount of from about 0.1% to about 5% by weight of the water therein. In certain exemplary embodiments, the gelling agents are present in a treatment fluid of the present invention in an amount in the range of from about 0.2% to about 1% by weight of the water therein.

Derivatizing agents are compounds that may be chemically attached to a gelling agent to create a derivatized gelling agent. The chemical link that occurs between the derivitizing agent and the gelling agent may be temporary, reversible, or permanent. While derivatizing agents are often relatively small, discreet molecules, they may also be polymeric. Generally, the properties described above as to gelling agents (that they may be a natural polymer, a biopolymer, a synthetic polymer, or a combination thereof) apply equally well to compounds suitable for use as derivitizing agents in the present invention. It is within the ability of one skilled in the art to select the type of derivatized gelling agent desired to be used for a particular subterranean treatment.

The carbonyl-containing first compound, whether it is a gelling agent or a derivitizing agent, must contain a carbonyl moiety capable of forming a derivatizing linkage with an amine-containing moiety. Suitable carbonyl moieties include, but are not limited to, ketone moieties and aldehyde moieties. In certain embodiments, the first compound may be oxidized to form a carbonyl group. Suitable oxidizers include, but are not limited to, periodic acid, a periodate ($IO_4^-$), a salt of a periodate (e.g., potassium periodate), a salt of a hypochlorite, sodium bromide, a 2,2,6,6-Tetramethylpiperidine-1-oxyl ("TEMPO") based catalyst, and combinations thereof. In some embodiments wherein the compound being modified to have a carbonyl moiety is a polysaccharide gelling agent, the amount of oxidizer used ranges from about 0.1 mol % to about 25 mol % of oxidizing agent relative to the mole equivalents of anhydro-sugar units making up the polysaccharide; in other embodiments the amount of oxidizer ranges from about 0.5 mol % to about 15 mol %; and in still other embodiments the amount of oxidizer ranges from about 1 mol % to about 10 mol %. The degree of oxidation will depend on the desired gel strength, crosslink time, and any potential loss of base fluid viscosity due to oxidation, all of which will be understood by those practiced in the art.

In certain exemplary embodiments, the first compound may be oxidized or otherwise modified to contain a carbonyl moiety before its inclusion in a treatment fluid. In other embodiments, the first compound may be oxidized or otherwise modified to contain a carbonyl moiety on-the-fly, generally after incorporation into a treatment fluid. In some such embodiments, an oxidizing agent capable of interacting with the first compound to form a carbonyl-containing first compound is added to a treatment fluid and the first compound is then modified in situ in the treatment fluid to comprise a carbonyl moiety. It will be understood by one skilled in the art that to create carbonyl-containing first compounds suitable for use in the present invention, methods other than oxidation, such as derivatization of the compound with a carbonyl containing chemical compound, may be suitable for adding a carbonyl group to create a carbonyl-containing first compound. The number of carbonyl groups present on the first compound may be tailored to achieve a certain level of derivatization, for example, where a greater extent of derivatization is desired, the first compound may be modified such that it contains a greater number of carbonyl moieties.

The amine-containing second compound, whether it is a gelling agent or a derivatizing agent, must contain an amine moiety capable of forming a derivatizing linkage with a carbonyl-containing moiety. The amine moiety of the second compound is itself capable of forming an imine functional group or an enamine functional group. Suitable amine moieties include primary amines and secondary amines. Suitable amine-containing moieties include, but are not limited to, a hydrazide group (i.e., $NH_2$—NH—CO—), a hydrazine group (i.e., —NH—$NH_2$); diamino compounds such as ethylenediamine, diaminohexane, or amino acids; polyethyleneimine; polyallylamine; proteins and peptides; or a combination thereof. In some embodiments of the methods of the present invention, the amine-containing second compound may be a polymer. The number of amine groups present on the second compound may be tailored to achieve a certain level of derivatization, for example, where a greater extent of derivatization is desired, the second compound may be modified such that it contains a greater number of amine moieties.

The carbonyl-containing first compounds and amine-containing second compounds suitable for use in the treatment fluids of the present invention are capable of interacting to form one or more derivatizing linkages and thus to create a derivatized gelling agent. Generally, such derivatizing linkage is formed when a carbonyl moiety from a carbonyl-containing first compound reacts with an amine moiety from an amine-containing second compound. The reaction may form a carbinolamine, an imine, an enamine, or a combination thereof. The stability of any resultant imine or enamine may be dependent on pH, temperature, or both. By way of example, an imine may be formed under mild acid conditions of from about pH 3 to about pH 10 and mild temperatures of from about 10° C. to about 75° C. When the carbonyl moiety and amine moiety react, a derivatizing linkage is formed that creates a derivatized gelling agent.

While an imine or enamine group may be useful in forming the derivatizing linkage, in certain embodiments, once the derivatizing linkage is formed it may be made more stable by reducing the imine or enamine to an amine, e.g., via reductive amination. Such a reduction reaction works to make the derivatizing linkage substantially less reversible. A reduction may be accomplished with any suitable reducing agent. Suitable readily available reducing agents include, but are not limited to, borohydrides and cyanoborohydrides. In certain exemplary embodiments, the reducing agent is sodium borohydride ($NaBH_4$). At least in part, selection of a reducing agent depends on the desired strength of the reducing agent desired; for example, under certain conditions borohydrides may reduce both the imine and carbonyl groups whereas the cyanoborohydrides may more readily reduce the imine groups. Persons having ordinary skill in the art, with the benefit of this disclosure, will recognize the appropriate reducing agent to use depending on, among other things, the specific gelling agent used, the specific derivatizing agent used, and the like.

The derivatized gelling agents of the present invention may be used as viscosifing agents in subterranean treatment fluids such as fracturing fluids, gravel packing fluids, and frac-pack fluids. Some such subterranean treatment fluids further comprise particulates suitable for subterranean applications. Suitable particulates include, for example, gravel, sand, particulate garnet, glass, nut hulls, seed hulls, nylon pellets, aluminum pellets, bauxite materials, ceramic materials, polymeric materials, plastic materials, resinous materials, polymeric materials comprising nut hulls, a combination thereof, or the like. Suitable sizes range from about 4 to about 100 U.S. mesh. In certain exemplary embodiments, the particulates have a particle size in the range of from about 10 to about 70 U.S. mesh. In certain exemplary embodiments, the particulates used may be included in the subterranean treatment fluid, among other reasons, to act as gravel, as proppant, or as a bridging agent in a fluid loss control operation. In certain embodiments, the particulates may be at least partially coated with a resin, tackifying agent, or other consolidation material.

In some embodiments of the present invention the derivatized gelling agents may be crosslinked to further increase the viscosity of a treatment fluid comprising the derivatized gelling agent. Suitable crosslinkers typically comprise at least one metal that is capable of crosslinking at least two gelling agent molecules. Examples of suitable crosslinkers include, but are not limited to, zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the treatment fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

Additional additives may be present in the treatment fluids of the present invention as deemed appropriate by one skilled in the art with the benefit of this disclosure. Examples of such additives include, but are not limited to, buffers, surfactants, scale inhibitors, clay stabilizers, foaming agents, silicate-control agents, antifoaming agents, flow assurance chemicals, foaming agents, storage stabilizers, biocides, biostatic agents, or combinations thereof. In addition, traditional crosslinking agents may be added to the treatment fluid in addition to the amine crosslinking agent of the present invention.

The treatment fluids of the present invention may be used for carrying out a variety of subterranean well treatments, including, but not limited to, fracturing, gravel packing, frac-packing, and plugging. In certain exemplary embodiments wherein a treatment fluid is used in conjunction with fracturing operations, fracturing fluids comprising water, a carbonyl-containing first compound (which may be a gelling agent or a derivatizing agent), and an amine-containing second compound (which is a gelling agent where the carbonyl-containing first compound is a derivatizing agent, or vice versa) may be placed in a subterranean formation at a sufficient pressure to create or enhance one or more fractures therein. After the fracturing fluid has performed its desired function, or after a desired period of time, the viscosity of the fracturing fluid may be reduced and the fracturing fluid recovered.

In certain exemplary embodiments wherein the treatment fluids of the present invention are used in conjunction with gravel packing operations, gravel packing fluids comprising water, a particulate, a carbonyl-containing first compound (which may be a gelling agent or a derivatizing agent), and an amine-containing second compound (which is a gelling agent where the carbonyl-containing first compound is a derivatizing agent, or vice versa) are placed in a portion of a well bore so as to create a gravel pack. After the gravel pack is substantially in place, the viscosity of the gravel packing fluid may be reduced and the gravel packing fluid recovered.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a subterranean formation with a viscosified treatment fluid comprising:
    combining water, a carbonyl-containing first compound, and an amine-containing second compound;
        wherein the carbonyl-containing first compound comprises at least one carbonyl moiety and is either a gelling agent or a derivatizing agent, and
        wherein the amine-containing second compound comprises at least one amine moiety and is a gelling agent when the carbonyl-containing first compound is a derivatizing agent and is a derivatizing agent when the carbonyl-containing first compound is a gelling agent;
    allowing at least one carbonyl moiety from the first compound and at least one amine moiety from the second compound to form a derivatizing linkage and create a derivatized gelling agent; and,
    placing the viscosified treatment fluid into a portion of a subterranean formation.

2. The method of claim 1 wherein the carbonyl-containing first compound is a gelling agent and the amine-containing second compound is a derivatizing agent.

3. The method of claim 1 wherein the carbonyl-containing first compound is a derivatizing agent and the amine-containing second compound is a gelling agent.

4. The method of claim 1 wherein the subterranean treatment fluid has a pH from about 4 to about 11.

5. The method of claim 1 wherein the gelling agent is selected from the group consisting of: a polysaccharide, a natural polymer, a biopolymer, a synthetic polymer, and combinations thereof.

6. The method of claim 1 wherein the derivatizing agent is selected from the group consisting of: a halide, an epoxide, a polysaccharide, a natural polymer, a biopolymer, a synthetic polymer, and combinations thereof.

7. The method of claim 1 wherein the derivatized gelling agent is present in the treatment fluid in the amount of from about 0.1% to about 5% by weight of the water in the treatment fluid.

8. The method of claim 1 wherein the carbonyl-containing first compound is exposed to an oxidizer to form a carbonyl group and wherein the oxidizer is selected from the group consisting of: a periodic acid, a periodate, a salt of a periodate, a salt of a hypochlorite, sodium bromide, a 2,2,6,6-Tetramethylpiperidine-1-oxyl based catalyst, and combinations thereof.

9. The method of claim 1 wherein the amine moiety is selected from the group consisting of: a primary amine, a secondary amine, a hydrazide group, a hydrazine group, a diamino compound, a polyethyleneimine, a polyallylamine, a protein, a peptide, and combinations thereof.

10. The method of claim 1 wherein the derivatizing linkage is reduced via reductive ammination.

11. The method of claim 1 wherein the derivatized gelling agent is crosslinked with a crosslinking agent and wherein the crosslinking agent at is selected from the group consisting of: a zirconium compound, a titanium compound, a boron compound, an aluminum compound, an antimony compound, a chromium compound, an iron compound, a copper compound, a zinc compound, and combinations thereof, and wherein the crosslinking agent is present in the treatment fluid in the amount of from about 0.001% to about 10% by weight of the water in the treatment fluid.

12. A method of fracturing a portion of a subterranean formation with a viscosified treatment fluid comprising:
    combining water, a carbonyl-containing first compound, and an amine-containing second compound;
        wherein the carbonyl-containing first compound comprises at least one carbonyl moiety and is either a gelling agent or a derivatizing agent, and
        wherein the amine-containing second compound comprises at least one amine moiety and is a gelling agent when the carbonyl-containing first compound is a derivatizing agent and is a derivatizing agent when the carbonyl-containing first compound is a gelling agent;
    allowing at least one carbonyl moiety from the first compound and at least one amine moiety from the second compound to form a derivatizing linkage and create a derivatized gelling agent; and,
    placing the viscosified treatment fluid into a portion of a subterranean formation at a pressure sufficient to create or extend at least one fracture therein.

13. The method of claim 12 wherein the subterranean treatment fluid has a pH from about 4 to about 11.

14. The method of claim 12 wherein the gelling agent is selected from the group consisting of: a polysaccharide, a natural polymer, a biopolymer, a synthetic polymer, and combinations thereof.

15. The method of claim 12 wherein the derivatizing agent is selected from the group consisting of: a halide, an epoxide, a polysaccharide, a natural polymer, a biopolymer, a synthetic polymer, and combinations thereof.

16. The method of claim 12 wherein the derivatized gelling agent is present in the treatment fluid in the amount of from about 0.1% to about 5% by weight of the water in the treatment fluid.

17. The method of claim 12 wherein the carbonyl-containing first compound is exposed to an oxidizer to form a carbonyl group and wherein the oxidizer is selected from the group consisting of: a periodic acid, a periodate, a salt of a periodate, a salt of a hypochlorite, sodium bromide, a 2,2,6,6-Tetramethylpiperidine-1-oxyl based catalyst, and combinations thereof.

19. The method of claim 12 wherein the amine moiety is selected from the group consisting of: a primary amine, a secondary amine, a hydrazide group, a hydrazine group, a diamino compound, a polyethyleneimine, a polyallylamine, a protein, a peptide, and combinations thereof.

19. The method of claim 12 wherein the derivatizing linkage is reduced via reductive ammination.

20. The method of claim 12 wherein the derivatized gelling agent is crosslinked with a crosslinking agent and wherein the crosslinking agent is selected from the group consisting of: a zirconium compound, a titanium compound, a boron compound, an aluminum compound, an antimony compound, a chromium compound, an iron compound, a copper compound, a zinc compound, and combinations thereof, and wherein the crosslinking agent is present in the viscosified treatment fluid in the amount of from about 0.001% to about 10% by weight of the water in the viscosified treatment fluid.

* * * * *